UNITED STATES PATENT OFFICE.

OSCAR WARREN PICKERING, OF SPRINGFIELD, MASSACHUSETTS, ASSIGNOR TO PICKERING PAINT AND PIGMENT COMPANY, A CORPORATION OF WEST VIRGINIA.

PIGMENT AND PAINT.

1,113,907.  Specification of Letters Patent.  Patented Oct. 13, 1914.

No Drawing.  Application filed August 5, 1913.  Serial No. 783,014.

*To all whom it may concern:*

Be it known that I, OSCAR WARREN PICKERING, a citizen of the United States, residing at Springfield, in the county of Hampden and State of Massachusetts, have invented certain new and useful Improvements in Pigments and Paints, of which the following is a specification.

This invention relates to a new pigment and paint thereof and has for some of its objects the production of a pigment or paint which will have, greater spreading power, less disintegrating or decomposing character when exposed to ingredients of or associated with the atmosphere, more permanency or stability when exposed to light, and less specific gravity, whereby the settling out from the paint vehicle is prevented, and which will be more readily miscible with oils or other vehicles than such substances as "white lead," contain less lead and produce greater and better results, and it comprises a compound or composition of lead with aluminum and oxygen in the form of lead aluminate or its equivalent and the same associated with a vehicle, such as a drying oil of the linseed type and in some cases with a diluent of drying nature such as turpentine, in the form of paint or similar commodity.

When ordinary "white lead" is employed in or as a paint associated with such vehicles as linseed oil and turpentine the specific gravity of the lead compound or composition which comprises a lead carbonate and hydroxid (hydrate) in proportion of approximately two parts of the former to one part of the latter, or chemically $$2PbCO_3 - Pb(OH)_2$$

is such that it soon separates or settles out from mixed paint and is hard to remix again to a uniform consistency. The lead compound or composition when exposed to the atmosphere is readily attacked and decomposed by sulfur therein and turned black and it is to obviate these and other difficulties that the present invention is devised.

The lead aluminate which is preferred is the normal aluminate produced by the action of lead acetate on sodium aluminate thus:—

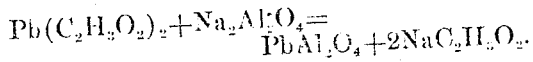

The sodium acetate is washed out of the lead aluminate precipitate and the acetic acid recovered by treatment with a stronger acid such as sulfuric. The lead aluminate thus produced is thoroughly washed and dried, yielding a white product of superior mixing qualities with oils and producing a paint which readily spreads and presents a body covering of great light diffusive quality.

It will be noted that the lead aluminate contains aluminum oxid in place of carbon dioxid of the ordinary "white lead" which is more permanent and less affected by decomposing ingredients of the atmosphere and it more readily assimilates with oils or other paint vehicles and especially with drying oils, such as linseed, tung, and the like, or the same associated with driers such as turpentine. Instead of a pigment composed of lead aluminate *per se*, the lead aluminate may be associated with lead hydroxid or hydrate corresponding to "white lead" except that the lead carbonate is substituted by lead aluminate thus:—

White lead, $2PbCO_3 - Pb(OH)_2$.
New pigment, $2PbAl_2O_4 - Pb(OH)_2$.

This compound or composition of lead aluminate and lead hydroxid or hydrate may be produced by acting on a mixture of sodium aluminate and sodium hydroxid or hydrate with lead acetate whereby the two compounds, viz. lead aluminate and lead hydroxid (hydrate) are thrown down or precipitated from the aqueous solution of the compounds referred to in such an intimate state of division and admixture as to present the appearance of an actual chemical compound similar to the lead carbonate and lead hydroxid (hydrate) compound or composition of the so called "white lead."

It will be noted that in the compound comprising lead aluminate that the percentage of lead in the compound over that in white lead or lead carbonate is reduced and the bulk of the paint increased by the employment of the aluminate and the product is therefore much cheaper as to cost than white lead, while at the same time it yields a product of great superiority over the old form of lead carbonate and hydrate both as to spreading power and resistance to atmospheric decomposition, thereby producing a product which is more permanent in character.

It is obvious that the lead aluminate may be produced in any convenient manner other than that described and that the pigment may be associated with any selective vehicle in producing the paint without departing from the spirit of the invention which broadly comprises as a new pigment or paint a metal aluminate or its equivalent, or specifically lead aluminate, or either associated or combined with a metal hydroxid or hydrate, or specifically lead hydroxid or hydrate, or such compounds or compositions associated with a paint vehicle, such as a drying oil (linseed) or the same with a drier (turpentine):

The so called "white lead" contains lead compounds which are slightly soluble in water and produce a poisoning effect when employed, to the painter, the maker, and the user, which is largely prevented if not entirely avoided in the making, employment, and use of the less soluble lead aluminate in place of the lead carbonate which is contained in white lead.

In the manufacturing, shipping, and dispensing of mixed paints the lead aluminate pigment is of great utility, in that its lesser gravity than white lead maintains it in a mixed or suspended condition in the paint vehicle, thus avoiding the settling out of the pigment to a great extent and yielding a more uniformly mixed paint and maintained as such, which is of greater utility, durability, spreading power, and practical utility, than pigments and paints of mixed character employed hitherto.

Any other metal hydroxid may be substituted for the lead hydroxid in the lead aluminate compound or composition, such as aluminium, zinc, or other metal hydroxid.

It is obvious that the metal of the aluminate may exist at any atomicity and the ultimate may comprise the normal, basic, or other variety without departing from the spirit of the invention.

Having now described my invention what I claim as new and desire to secure by Letters Patent is:—

1. A new pigment comprising lead aluminate.

2. A paint comprising lead aluminate and a vehicle.

3. A paint comprising lead aluminate and an oil.

4. A paint comprising lead aluminate and a drying oil.

5. A paint comprising lead aluminate, an oil, and a drier.

6. A paint comprising lead aluminate, a drying oil, and a drier.

7. A paint comprising lead aluminate, an oil, and turpentine.

8. A paint comprising lead aluminate, a drying oil, and turpentine.

In testimony whereof I affix my signature in the presence of two witnesses.

OSCAR WARREN PICKERING. [L. S.]

Witnesses:
  J. E. CLEGG,
  GEO. F. HUNTLY.